Patented Apr. 20, 1948

2,440,110

UNITED STATES PATENT OFFICE 2,440,110

STABILIZED SILVER HALIDE EMULSIONS

Fritz W. H. Mueller, Binghamton, N. Y., assignor to General Aniline & Film Corporation, New York, N. Y., a corporation of Delaware No Drawing. Application October 6, 1944, Serial No. 557,545

5 Claims. (Cl. 95—7)

This invention relates to the improvement of photographic emulsions and more particularly to the incorporation of antifogging or stabilizing agents into sliver halide emulsions.

A large number of substances have been described as being effective in preventing an increase in fog and thus stabilizing or controlling the keeping quality of photographic emulsions. Many of these stabilizers have definite limitations in their ability to produce desirable effects without producing unfavorable side reactions. Thus, some stabilizers desensitize or produce fog, when added during the mixing or ripening, but exert favorable effects when added to the melted emulsion before coating. It is one object of this invention, therefore, to produce a stabilizing emulsion of improved photographic quality while incorporating the stabilizing agents over a wider range of application during the manufacture of photographic emulsions.

In U. S. Patent 2,057,764 there is described a process of stabilizing photographic silver halide emulsions by incorporating sulfinic or seleninic acids or their salts into the emulsion in the form of a solution in a suitable solvent during the preparation of the emulsion or by incorporating the stabilizer into the finished emulsion by bathing the emulsion layer with a weak solution of the stabilizer. It was found that the fogging influence of supports, preparation layers, backing layers, intermediate layers, sublayers, protective layers, or baryta layers could be prevented by incorporating these stabilizers into such layers. As compared with films which were not provided with the sulfinic acid or seleninic acid stabilizers, it is stated that the films containing the stabilizer showed a fog density unit of approximately one-half. It has now been discovered that the stabilizing effect of the sulfinic or the seleninic acids or their salts, disclosed in U. S. Patent 2,057,764, can be considerably improved and the range of application greatly extended if small amounts of aromatic or heterocyclic polysulfides possessing substituted or unsubstituted rings which do not in and of themselves produce any antifogging action are present in the emulsions containing the sulfinates or seleninates. Compounds of this type have the formula:

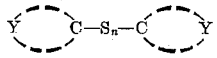

wherein Y represents the atoms necessary to complete an aromatic or heterocyclic ring system and $n$ is a whole number greater than 1. In the case of the aromatic polysulfides, it is to be understood that those which do not possess any antifogging activity in and of themselves include polysulfides having unsubstituted aromatic rings and aromatic rings substituted by the following substituents: sulfonic acid, carbonic acid, primary amino, nitro and alkyl groups.

It has been observed that extremely small quantities of the aromatic or heterocyclic polysulfides will improve the stabilizing characteristic of photographic emulsions containing a sulfinate or seleninate to an extent unobtainable with a sulfinate or seleninate alone. Thus, the photographic effect of sodium sulfinate or seleninate is improved by the addition of 0.00025–0.0050 mols per mol of sulfinate or seleninate of such aromatic and heterocyclic polysulfides as (a) Diphenyl disulfide
(b) 2-2'-diamino benzene disulfide
(c) p-p'-diphenyl disulfide disulfonic acid sodium salt
(d) p-p'-diphenyl disulfide dicarbonic acid sodium salt
(e) 2-2'-4-4'-tetra nitro diphenyl disulfide
(f) Ditolyl disulfide
(g) Dibenzyl disulfide
(h) Bis-(mercaptothiodiazole) disulfide
(i) Pyridine disulfide and the corresponding polysulfides of any of these compounds. The improved result, expressing fog in terms of density units, is manifested by a reduction of the fog density of approximately one-half the fog density obtained when using a sulfinate or seleninate alone. This reduction in fog density produces better clearness, better keeping quality and an unusual brilliance which is especially desirable in medical and industrial radiographs.

The same reduction in fog density is obtained whether the aromatic or heterocyclic polysulfide compound is added with the sulfinate or seleninate during mixing or during the ripening stage in the process of making the silver halide emulsion or to the molten emulsion prior to coating. In the latter case, solvents for the stabilizer mixture are employed which do not affect emulsions such as water or organic solvents which are miscible with water, for instance alcohol. The stabilizing mixture of the sulfinic acid salt or seleninic acid salt and the polysulfide compound may also be employed in preparation layers, backing layers, intermediate layers, sublayers, protective layers, and baryta layers in order to minimize any possible fogging influence of such layers.

Without in any way wishing to be bound by or limited to any particular theory as to the mechanism of the additional stabilizing effect produced by the aromatic or heterocyclic polysulfide, it is believed that this additional stabilizing effect is either a catalytic one or is due to a chemical interaction between the polysulfide compound and the sulfinate or seleninate with the possible production of a reaction product which exerts the enhanced stabilizing influence on the silver halide emulsion. The following examples will serve to further illustrate the invention, it being understood that the invention is not limited thereto:

*Example I*

To 1 kilogram of a gelatino-silver-halide emulsion containing from 6 to 7% of silver halide and approximately 8% gelatin, there were added during the ripening stage: 15 cc. of a 20% solution of sodium salt of benzene sulfinic acid and 5 cc. of an alcoholic solution of diphenyl disulfide of the concentration of one gram per liter of methanol.

The melted emulsion was cast on a film base and cut into test film lengths. Similar test films were made with the same silver halide emulsion but omitting the addition of either the sodium salt of benzene sulfinic acid or of diphenyl disulfide. Additional similar test films were made with the same silver halide emulsion to which had been added during ripening the same quantity of the sodium salt benzene sulfinic acid as above but omitting the diphenyl disulfide.

The fog density of each of these types of test film was determined for the freshly prepared film and test pieces of each type were then incubated for a period of six days at 50° C. It was observed that the fog density of the films treated with benzene sulfinic acid to which had been added diphenyl disulfide was decreased by about from 50 to 67% in the case of the freshly prepared film and from about 60 to 66% in the case of the incubated film of the fog density of the films which had been treated only with the benzene sulfinic acid sodium salt. The improvement was even more pronounced when compared with the test film which had not received either stabilizing treatment.

*Example II*

To 1 kilogram of a gelatino-silver-halide emulsion containing from 6 to 7% silver halide and approximately 8% gelatin, there were added during the ripening stage: 10 cc. of a 20% solution of sodium salt of benzene seleninic acid and 5 cc. of an alcoholic solution of ditolyl disulfide of the concentration of one gram per liter of methanol.

The melted emulsion was then cast on a film base and cut into test film lengths. Similar test films were made with the same silver halide emulsion but omitting the addition of either the sodium salt of benzene seleninic acid or of ditolyl disulfide. Additional similar test films were made with the same silver halide emulsion to which had been added during ripening the same quantity of the sodium salt benzene seleninic acid as above but omitting the ditolyl disulfide.

The fog density of each of these types of test film was determined for the freshly prepared film and test pieces of each type were then incubated for a period of six days at 50° C. It was observed that the fog density of the films treated with benzene seleninic acid to which had been added ditolyl disulfide was decreased by from about 50 to 68% in the case of the freshly prepared film and from about 60 to 66% in the case of the incubated film of the fog density of the films which had been treated only with the benzene selenenic acid sodium salt. The decrease in fog density produced by the combination of this example was about 80% of the fog density of the test film, which was not treated with either the seleninate or the combination of seleninate and ditolyl disulfide.

*Example III*

To one kilogram of a gelatino-silver-halide emulsion of the high speed portrait type ready for coating, there was added: 10 cc. of a 20% solution of benzene sodium seleninate and 1 cc. of a solution of bis-(mercaptothiodiazole) disulfide of a concentration of 1 gram in one liter of methanol.

Films made from an emulsion treated in accordance with this example and films made in the same manner but treated only with the benzene sodium seleninate were compared for fog density. It was found that the fog density of the films treated in accordance with this example by both the benzene sodium seleninate and the heterocyclic disulfide had a fog density of approximately 50% of that shown by the films treated only with the benzene sodium seleninate. Accordingly, it is apparent that the stabilizing effect of the mixture of this example is considerably better than that which is obtained under identical conditions by applying only the benzene seleninate.

*Example IV*

To a gelatino-silver-halide emulsion containing silver nitrate corresponding to 100 grams silver halide, there were added immediately after precipitation of the silver halide and prior to the first digestion: 90 cc. of a 20% solution of a benzene sulfinate and 20 cc. of a solution of benzyl-disulfide in a concentration of one gram per liter of methanol.

The emulsion was subsequently washed and after-ripened in the usual manner. As in the previous examples, clearness and keeping quality of this emulsion, while depending to some degree on the type of gelatin employed, was found to be considerably improved as compared to that obtained with the addition of sodium benzene sulfinate but without the addition of benzyldisulfide.

What I claim as my invention and desire to be secured by Letters Patent of the United States is:

1. A photographic material comprising a silver halide gelatin emulsion in contact with a member of the group consisting of a sulfinic acid, a seleninic acid and their salts, and a polysulfide compound selected from the group consisting of aromatic and heterocyclic polysulfide compounds of the following structural formula:

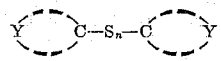

wherein Y represents the atoms necessary to complete an aromatic or heterocyclic ring system and $n$ is a whole number greater than 1, in the proportion of from 0.00025 to 0.0050 mol of the member of the last named group to 1 mol of the member of the first named group.

2. A photographic material comprising a silver halide gelatin emulsion containing a member of the group consisting of a sulfinic acid, a seleninic acid and their salts, and a polysulfide compound selected from the group consisting of aromatic and heterocyclic polysulfide compounds having the following structural formula:

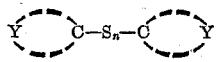

wherein Y represents the atoms necessary to complete an aromatic or heterocyclic ring system and $n$ is a whole number greater than 1, in the proportion of from 0.00025 to 0.0050 mol of the member of the last named group to 1 mol of the member of the first named group.

3. A photographic material comprising a silver halide gelatin emulsion in contact with a member of the group consisting of a sulfinic acid, a seleninic acid and their salts, and ditolyl disulfide in the proportion of from 0.00025 to 0.0050 mol of the ditolyl disulfide to 1 mol of the selected member of said group.

4. A photographic material comprising a silver halide gelatin emulsion in contact with a member of the group consisting of a sulfinic acid, a seleninic acid and their salts, and diphenyl disulfide in the proportion of from 0.00025 to 0.0050 mol of the diphenyl disulfide to 1 mol of the selected member of said group.

5. A photographic material comprising a silver halide gelatin emulsion in contact with a member of the group consisting of a sulfinic acid, a seleninic acid and their salts, and dibenzyl disulfide in the proportion of from 0.00025 to 0.0050 mol of the dibenzyl disulfide to 1 mol of the selected member of said group.

FRITZ W. H. MUELLER.

REFERENCES CITED

The following references are of record in the file of this patent:

UNITED STATES PATENTS

| Number | Name | Date |
|---|---|---|
| 1,962,133 | Brooker et al. | June 12, 1934 |
| 2,057,764 | Brunken | Oct. 20, 1936 |